US011988027B2

(12) United States Patent
Napier et al.

(10) Patent No.: US 11,988,027 B2
(45) Date of Patent: May 21, 2024

(54) MAGNETIC DOOR STOP AND DOOR HOLDER

(71) Applicant: Cortex, LLC, Knoxville, TN (US)

(72) Inventors: Rodney Napier, Knoxville, TN (US); Zachary P. Beard, Jefferson City, TN (US)

(73) Assignee: Cortex, LLC, Knoxville, TN (US)

( * ) Notice: Subject to any disclaimer, the term of this patent is extended or adjusted under 35 U.S.C. 154(b) by 0 days.

(21) Appl. No.: 18/456,565

(22) Filed: Aug. 28, 2023

(65) Prior Publication Data

US 2024/0068281 A1 Feb. 29, 2024

Related U.S. Application Data

(60) Provisional application No. 63/401,810, filed on Aug. 29, 2022.

(51) Int. Cl.
*E05C 17/56* (2006.01)
*E05F 5/06* (2006.01)

(52) U.S. Cl.
CPC ................ *E05C 17/56* (2013.01); *E05F 5/06* (2013.01)

(58) Field of Classification Search
CPC .... Y10T 292/11; Y10T 292/34; Y10T 292/37; Y10T 292/15; Y10T 292/17; E05C 17/56;
(Continued)

(56) References Cited

U.S. PATENT DOCUMENTS 2,277,057 A * 3/1942 Bach ..................... H01F 7/0221 446/139
2,472,397 A * 6/1949 Bennett ................... E05C 17/56 16/85
(Continued)

FOREIGN PATENT DOCUMENTS

CA 2957945 A1 8/2018
CA 2957945 A1 * 8/2018 ............. E05C 17/56
(Continued)

OTHER PUBLICATIONS

Espacnet machine translation JP2002271052A Sep. 20, 2002 description and claims (Year: 2023).*
(Continued)

*Primary Examiner* — Kristina R Fulton
*Assistant Examiner* — Steven A Tullia
(74) *Attorney, Agent, or Firm* — Luedeka Neely, P.C.

(57) ABSTRACT

A magnetic doorstop and door holder provides an aesthetically pleasing, functionally simple, and effective solution to allow homeowners to closely control an amount of force needed to maintain a door in an open position. The system is designed to work with most doors, including traditional solid doors and hollow core doors. The system involves magnetic and/or ferromagnetic materials affixed to or embedded within various entryway components, including doors, door jambs, door frames, and door hinges, and within walls and/or flooring adjacent to the entryway. The system is designed to be highly customizable to fit each homeowner's particular needs and circumstances, and adjustable based on the type of door or entryway layout and based on the homeowner's desired strength of holding and precise positioning.

11 Claims, 4 Drawing Sheets

(58) Field of Classification Search
CPC ........ E05C 17/00; E05C 17/025; E05C 19/16; E05C 19/165; E05F 5/06; E05B 17/005
USPC .................................... 16/82, 85, 86 R, 86 A
See application file for complete search history.

(56) References Cited

U.S. PATENT DOCUMENTS 2,496,691 A 2/1950 Berry
2,602,182 A * 7/1952 Johnson .................. E06B 1/045 49/504
2,638,620 A * 5/1953 Civitelli .................. E05D 11/06 16/86 A
2,813,293 A * 11/1957 Civitelli .................... E05F 5/06 16/86 B
2,813,294 A * 11/1957 Civitelli .................. E05D 11/06 292/74
2,815,236 A * 12/1957 Lowinski ................ E05C 17/56 52/DIG. 4
2,906,553 A 9/1959 Wilson
3,016,563 A 1/1962 Jong
3,025,559 A 3/1962 Basinger
3,135,012 A * 6/1964 Wessel ...................... E05F 5/06 16/86 B
3,157,906 A * 11/1964 Wolf ....................... E05D 11/00 16/50
3,163,453 A * 12/1964 Stephens ................. E05C 17/56 292/251.5
3,174,179 A * 3/1965 Benson ..................... E05F 5/06 16/86 A
3,187,372 A * 6/1965 Parsons ..................... E05F 5/06 16/86 A
3,261,631 A * 7/1966 Alessi ..................... E05C 17/56 292/251.5
3,273,926 A * 9/1966 Pietsch ................... E05C 19/16 292/251.5
3,288,511 A * 11/1966 Tavano ................... E05C 19/16 16/87 R
3,331,043 A * 7/1967 Orzabal ................ H01F 7/0252 335/302
3,539,214 A * 11/1970 Fisher ..................... E05C 19/16 292/144
3,562,850 A 2/1971 Eliason et al.
3,636,727 A 1/1972 James
3,913,171 A * 10/1975 Reid ......................... E05F 5/06 16/342
3,919,743 A 11/1975 Cutler
3,971,100 A * 7/1976 Anop ........................ E05F 5/06 16/80
3,971,581 A * 7/1976 Montgomery ........ E05C 19/166 292/251.5
4,058,335 A * 11/1977 Abe ........................ E05C 19/16 428/900
4,099,755 A * 7/1978 Anderson ............... E05C 19/16 292/251.5
4,212,392 A 7/1980 Mckenzie
4,259,762 A * 4/1981 Civitelli .................. E05D 11/06 16/86 B
4,505,502 A 3/1985 Tomita
4,527,303 A * 7/1985 Civitelli .................. E05D 11/06 16/236
4,669,766 A 6/1987 Hanchett, Jr. et al.
4,754,532 A * 7/1988 Thomson .................. H01F 7/02 24/303
4,858,273 A * 8/1989 Civitelli .................... E05F 5/06 16/86 A
4,858,622 A 8/1989 Osterweil
4,995,655 A 2/1991 Freeman
4,998,941 A * 3/1991 Smith ..................... E05D 11/06 16/374
5,010,622 A * 4/1991 Morita .................... E05C 17/56 292/DIG. 19
5,077,950 A 1/1992 Bretches et al.
5,237,724 A * 8/1993 Lee ........................... E05F 5/06 16/86 B
5,376,910 A * 12/1994 Geringer ............... E05C 19/166 335/278
5,400,005 A 3/1995 Bobry
5,473,841 A * 12/1995 Grillo ................... E05C 19/004 292/338
5,581,844 A * 12/1996 Raheb ....................... E06B 7/36 16/86 A
5,727,289 A * 3/1998 Reder ....................... E05F 5/06 16/375
5,887,917 A 3/1999 Luciana
6,163,453 A 12/2000 Hou et al.
6,182,336 B1 * 2/2001 Bauer ..................... A41F 1/002 24/66.1
6,226,842 B1 5/2001 Wong
6,489,870 B1 12/2002 Ward et al.
7,775,567 B2 8/2010 Ligtenberg et al.
8,016,330 B2 9/2011 Fullerton et al.
8,225,562 B2 7/2012 Parker
8,434,201 B2 5/2013 Wang
8,801,054 B2 8/2014 Ligtenbert et al.
8,864,188 B2 10/2014 Redgrave
8,955,891 B2 * 2/2015 Millsap ................. E05C 17/025 292/342
9,033,377 B2 * 5/2015 Day ........................ E05C 19/16 292/251.5
9,297,189 B2 3/2016 Ho
9,470,032 B2 10/2016 Swanberg et al.
9,689,527 B2 * 6/2017 Franklin ................ F16M 11/14
9,730,534 B2 * 8/2017 Pierson ................. F16B 47/003
9,756,905 B2 * 9/2017 Bielecki .................. A41F 1/002
10,173,292 B2 * 1/2019 Fullerton .............. B23P 15/001
10,441,096 B2 * 10/2019 Chung ................... F16M 11/10
10,704,306 B2 * 7/2020 Schartner ................ E05C 17/56
11,168,499 B2 * 11/2021 Pavlow ................... E05C 17/54
11,187,019 B2 11/2021 Sellar et al.
11,414,906 B1 * 8/2022 Tallent ................ E05D 11/1007
2004/0148734 A1 12/2004 Chiu
2005/0050681 A1 * 3/2005 Schlitter ................... E05F 5/06 16/82
2006/0006674 A1 1/2006 Kang et al.
2006/0125247 A1 * 6/2006 Furia ....................... E05C 17/56 292/251.5
2006/0236502 A1 10/2006 Chiang
2007/0000775 A1 1/2007 Nakahara et al.
2007/0007775 A1 * 1/2007 Gallas ..................... E05C 19/16 292/251.5
2007/0163077 A1 7/2007 Yang et al.
2008/0087053 A1 * 4/2008 Frazier ...................... E05C 7/04 70/95
2009/0027149 A1 * 1/2009 Kocijan ................ H01F 7/0273 335/288
2009/0273194 A1 * 11/2009 Patterson .................. H01F 7/04 335/306
2010/0162523 A1 7/2010 Ferguson
2010/0236167 A1 9/2010 Parker
2011/0018659 A1 * 1/2011 Fullerton .............. H01F 7/0284 335/295
2012/0066873 A1 * 3/2012 Lauder ...................... H01F 7/04 703/1
2013/0255033 A1 * 10/2013 Vu ........................... E05F 5/08 49/506
2014/0225385 A1 * 8/2014 Millsap ................. E05C 17/025 292/288
2016/0244981 A1 8/2016 Klein
2017/0086328 A1 3/2017 Ly et al.
2017/0159336 A1 6/2017 Parriott
2018/0128025 A1 * 5/2018 Estrada ................... E05C 17/56
2020/0318423 A1 10/2020 Napier et al.
2020/0340507 A1 10/2020 Kehdy
2021/0134501 A1 5/2021 de la Rosa

FOREIGN PATENT DOCUMENTS

CN 201159001 Y1 12/2008
CN 101994444 A * 3/2011 ............. E05C 19/16

(56) References Cited

FOREIGN PATENT DOCUMENTS

| | | | | | |
|---|---|---|---|---|---|
| CN | 101994444 | A | | 9/2014 | |
| CN | 206874098 | U | | 1/2018 | |
| CN | 108118989 | A | | 6/2018 | |
| CN | 107165515 | A | | 6/2019 | |
| CN | 209568834 | U | | 11/2019 | |
| CN | 209799664 | U | | 12/2019 | |
| CN | 111520012 | A | | 8/2020 | |
| CN | 111677392 | A | | 9/2020 | |
| CN | 111677392 | A | * | 9/2020 | E05D 7/043 |
| CN | 112610089 | A | | 4/2021 | |
| CN | 215369287 | U | | 12/2021 | |
| CN | 111577039 | B | * | 1/2022 | E05C 17/46 |
| CN | 111577039 | B | | 1/2022 | |
| DE | 2455520 | A1 | | 5/1976 | |
| DE | 3107195 | A1 | * | 2/1981 | E05C 17/56 |
| DE | 3041572 | A1 | | 6/1982 | |
| DE | 3107195 | A1 | | 9/1982 | |
| DE | 29918117 | U1 | * | 12/1999 | E05C 17/56 |
| DE | 29918117 | U1 | | 12/1999 | |
| DE | 202005016584 | U1 | | 1/2006 | |
| DE | 102007015130 | A1 | | 10/2008 | |
| DE | 202009014676 | | | 3/2010 | |
| DE | 202009014676 | U1 | * | 3/2010 | E05C 17/025 |
| DE | 102009049005 | A1 | * | 4/2011 | E05B 47/004 |
| DE | 102009049005 | A1 | | 7/2021 | |
| DE | 102020115423 | A1 | | 12/2021 | |
| DE | 102020115423 | A1 | * | 12/2021 | E05C 19/166 |
| EP | 0490663 | B1 | | 8/1996 | |
| EP | 1959087 | A1 | | 8/2008 | |
| EP | 2620571 | A2 | | 7/2013 | |
| EP | 2620571 | A2 | * | 7/2013 | E05C 17/26 |
| EP | 0490663 | A1 | * | 5/2020 | Y10T 292/11 |
| FR | 1179194 | A | | 5/1959 | |
| GB | 2348923 | B | | 10/2002 | |
| GB | 2452146 | A | | 2/2009 | |
| GB | 2452146 | A | * | 2/2009 | E05C 17/025 |
| JP | 58105524 | A | * | 6/1983 | A45C 13/1069 |
| JP | 10159425 | A | * | 6/1998 | E05C 17/50 |
| JP | h10159425 | A | | 6/1998 | |
| JP | 2002271052 | A | | 9/2002 | |
| JP | 2002271052 | A | * | 9/2002 | E05C 19/16 |
| JP | 2008019645 | A | * | 1/2008 | E05C 19/16 |
| JP | 2008184897 | B | | 1/2011 | |
| JP | 2008019645 | B | | 9/2011 | |
| KR | 200388641 | Y1 | | 7/2005 | |
| KR | 200423868 | Y1 | | 8/2006 | |
| KR | 20090110604 | A | * | 10/2009 | E05C 17/56 |
| WO | 9406319 | A1 | | 3/1994 | |
| WO | WO-9406319 | A1 | * | 3/1994 | H01F 7/0263 |
| WO | 03060269 | A1 | | 7/2003 | |
| WO | 2006094491 | A1 | | 9/2006 | |
| WO | WO-2006094491 | A1 | * | 9/2006 | H01F 7/0263 |
| WO | 2013057344 | A1 | | 4/2013 | |
| WO | 2018191809 | A1 | | 10/2018 | |
| WO | WO-2018191809 | A1 | * | 10/2018 | E05C 17/46 |
| WO | 2019239276 | A1 | | 12/2019 | |
| WO | WO-2019239276 | A1 | * | 12/2019 | A63H 33/046 |

OTHER PUBLICATIONS

Espacnet machine translation WO2006094491A1 Sep. 14, 2006 description and claims (Year: 2023).*

Epacenet machine translation WO2006094491A1 Sep. 14, 2006 description and claims (Year: 2023).

Espacenet machine translation JP2002271052A Sep. 20, 2002 description and claims (Year:2023).

* cited by examiner (Section A-A)

(Section B-B)

(Section C-C)

(Section D-D)

MAGNETIC DOOR STOP AND DOOR HOLDER

FIELD

This invention relates to the field of door hardware. More particularly, this invention relates to a doorstop and door holder that incorporates magnetic components.

BACKGROUND

Doors today are often equipped with standard equipment for holding doors open, such as kick-down doorstops, hook-and-latch type mechanisms, integrated wedges and props, pneumatic door closers, and basic magnetic devices. These existing technologies are not aesthetically or functionally pleasing and are not readily adjustable to meet the variety of needs posed by a plethora of door designs, which may vary by material, weight, and style.

SUMMARY

The aforementioned problems and more are solved by the magnetic doorstop and door holder described herein. The system provides an aesthetically pleasing, functionally simple, yet highly effective solution designed to grant everyday consumers control over their doors that is typically available only via professional installation. Moreover, the system is designed to work with most doors available on the market today, including not only traditional solid doors, but also hollow core doors, which often limit consumer options regarding existing doorstops and holders.

The system involves magnetic and/or ferromagnetic materials that are affixed to or embedded within various entryway components, including doors, door frames, door jambs, door hinges, and within walls and/or flooring adjacent to the entryway. The system is designed to be highly customizable to fit each consumer's particular needs and circumstances, and to be adjustable based not only on the type of door or entryway layout, but also based on the consumer's desired strength of hold and precise positioning.

Embodiments described herein are directed to a magnetic doorstop and door holder comprising a hinge pin doorstop body having a first end and an opposing second end. Disposed at the first end of the hinge pin doorstop body is a hinge pin receiving aperture configured to receive a hinge pin of a hinge of a door. The magnetic doorstop and door holder includes a first leg, an engagement member, and a second leg. The first and second legs both have a proximal end and a distal end. The proximal end of the first leg is connected to the second end of the hinge pin doorstop body, and the distal end of the first leg extends outward from the hinge pin doorstop body. The engagement member is disposed at the second end of the hinge pin doorstop body adjacent to the proximal end of the first leg. The proximal end of the second leg is adjustably received in the engagement member, and the distal end of the second leg extends outward from the engagement member. A first bumper is attached to the distal end of the first leg, and a second bumper is attached to the distal end of the second leg. A first magnet is attached to the first bumper, and a second magnet is attached to the second bumper. The magnetic doorstop and door holder includes first and second ferromagnetic structures. The first ferromagnetic structure is configured for attachment to the door and comprises one or more materials that are magnetically attracted to the first magnet. The second ferromagnetic structure is configured for attachment to a door frame, door jamb or wall to which the hinge is attached. The second ferromagnetic structure comprises one or more materials that are magnetically attracted to the second magnet.

In some embodiments, the second leg of the magnetic doorstop and door holder comprises a threaded shaft and the engagement member comprises a threaded aperture that receives the threaded shaft.

In some embodiments, the first and second bumpers are formed from polyurethane.

In some embodiments, the first magnet is embedded within the first bumper, and the second magnet is embedded within the second bumper.

In some embodiments, a force of magnetic attraction between the first magnet and the first ferromagnetic structure is adjustable based on selection of the thickness of the portion of the first bumper disposed between the first magnet and the first ferromagnetic structure.

In some embodiments, a force of magnetic attraction between the second magnet and the second ferromagnetic structure is adjustable based on selection of the thickness of the portion of the second bumper disposed between the second magnet and the second ferromagnetic structure.

In some embodiments, one or both of the first ferromagnetic structure and the second ferromagnetic structure comprise a ferromagnetic plate.

In some embodiments, one or both of the first ferromagnetic structure and the second ferromagnetic structure comprise a magnetic shunt assembly.

In some embodiments, the magnetic shunt assembly includes a housing containing a rotatable plate on which a plurality of magnets of various sizes are attached. A top plate on the housing has an aperture disposed in proximity to the rotatable plate. The force of magnetic attraction between the magnetic shunt assembly and the first or second magnet is adjustable based on selection of one of the plurality of magnets to be aligned with the aperture in the top plate.

In some embodiments, the magnetic shunt assembly includes a housing containing a rotatable top plate in which a plurality of apertures of various sizes are disposed. A magnet is fixedly attached to the housing in proximity to the rotatable top plate. The force of magnetic attraction between the magnetic shunt assembly and the first or second magnet is adjustable based on selection of one of the plurality of apertures to be aligned with the magnet.

In some embodiments, the magnetic shunt assembly includes a housing containing a top plate in which an adjustable size aperture, such as an iris aperture, is centrally disposed. A magnet is fixedly attached to the housing in proximity to the top plate and in alignment with the adjustable size aperture. The force of magnetic attraction between the magnetic shunt assembly and the first or second magnet is adjustable based on adjusting the size of the adjustable size aperture.

In another aspect, embodiments of the invention are directed to various configurations of a magnetic shunt assembly for adjusting a force of magnetic attraction between the magnetic shunt assembly and an adjacent ferromagnetic structure.

In a first embodiment, the magnetic shunt assembly comprises a housing containing a rotatable plate on which a plurality of magnets of various sizes are attached, and a top plate on the housing having an aperture disposed in proximity to the rotatable plate. The force of magnetic attraction between the magnetic shunt assembly and the adjacent ferromagnetic structure is adjustable based on selection of one of the plurality of magnets to be aligned with the aperture in the top plate.

In a second embodiment, the magnetic shunt assembly comprises a housing containing a rotatable top plate in which a plurality of apertures of various sizes are disposed, and a magnet fixedly attached to the housing in proximity to the rotatable top plate. The force of magnetic attraction between the magnetic shunt assembly and the adjacent ferromagnetic structure is adjustable based on selection of one of the plurality of apertures to be aligned with the magnet.

In a third embodiment, the magnetic shunt assembly comprises a housing containing a top plate in which an adjustable size aperture is centrally disposed, and a magnet fixedly attached to the housing in proximity to the top plate and in alignment with the adjustable size aperture. The force of magnetic attraction between the magnetic shunt assembly and the adjacent ferromagnetic structure is adjustable based on adjusting the size of the adjustable size aperture.

In some embodiments of the magnetic shunt assembly, the adjacent ferromagnetic structure comprises a magnet associated with a magnetic doorstop or a magnetic door holder.

BRIEF DESCRIPTION OF THE DRAWINGS

Further advantages of the invention are apparent by reference to the detailed description in conjunction with the figures, wherein elements are not to scale so as to more clearly show the details, wherein like reference numbers indicate like elements throughout the several views, and wherein.

DETAILED DESCRIPTION

Figure 1:
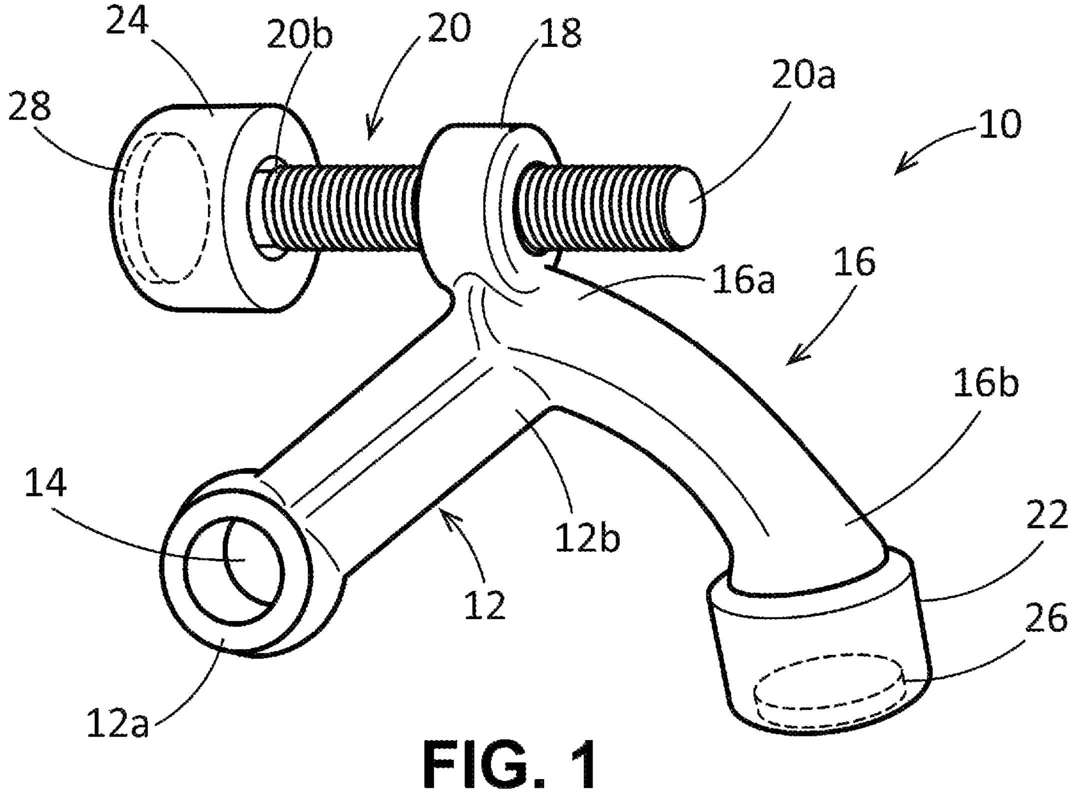
FIG. 1 depicts a magnetic doorstop and door holder incorporating a hinge pin doorstop component according to an embodiment of the invention.
Figure 2:
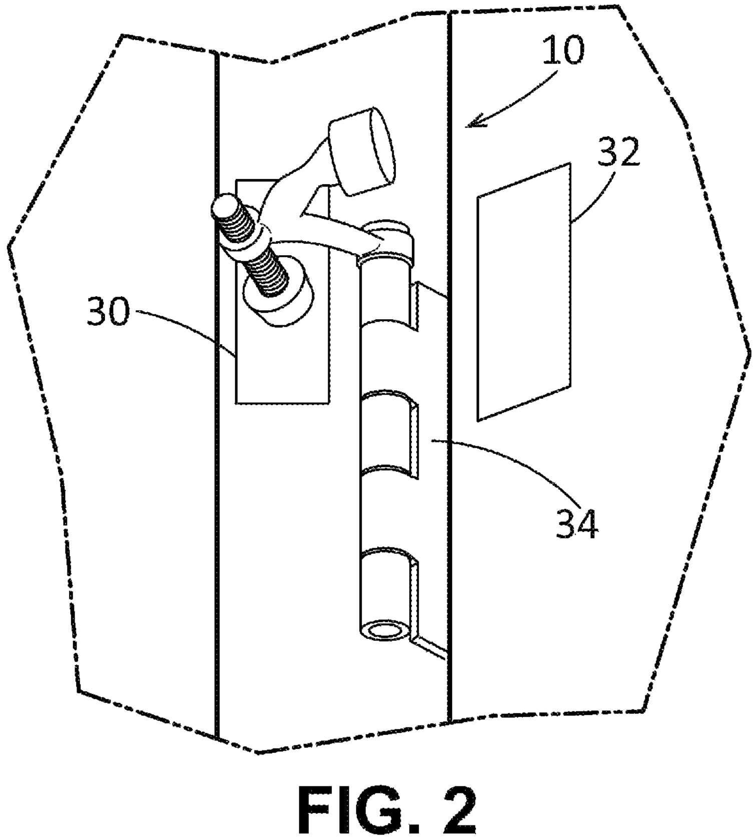
FIG. 2 depicts a magnetic doorstop and door holder incorporating a hinge pin doorstop component as installed in association with a door and door frame according to an embodiment of the invention.

Embodiments described herein are directed to a small, low profile magnetic system 10 that combines a doorstop and door holder, as depicted in FIGS. 1 and 2. As shown in FIG. 1, a preferred embodiment of the combination doorstop and door holder 10 includes a hinge pin doorstop body 12, a hinge pin receiving aperture 14, a first (nonadjustable) leg 16, an engagement member 18, a second (adjustable) leg 20, a first bumper 22, a second bumper 24, a first magnet 26, and a second magnet 28. The hinge pin doorstop body 12 has a first end 12*a* and a second end 12*b*. The hinge pin receiving aperture 14 is disposed at the first end 12*a* of the hinge pin doorstop body. The first leg 16 has a proximal end 16*a* connected to the second end 12*b* of the hinge pin doorstop body 12, and a distal end 16*b* extending outward from the hinge pin doorstop body 12. The engagement member 18 is disposed at the second end 12*b* of the hinge pin doorstop body 12 adjacent to the proximal end 16*a* of the first leg 16. The second leg 20 has a proximal end 20*a* adjustably received in the engagement member 18, and a distal end 20*b* extending outward from the engagement member 18. The first bumper 22 is attached to the distal end 16*b* of the first leg 16, and the second bumper 24 is attached to the distal end 20*b* of the second leg 20. In a preferred embodiment, the first and second bumpers 22 and 24 are formed from polyurethane. In a preferred embodiment, the first magnet 26 is embedded within the first bumper 22 and the second magnet 28 is embedded within the second bumper 24.

As shown in FIG. 2, a first ferromagnetic plate 32 is configured for attachment to the door in a location adjacent to the hinge 34, and a second ferromagnetic plate 30 is configured for attachment to a door frame, door jamb, wall adjacent to the door jamb, or other structure near the hinge 34. The first magnet 26 of the combination doorstop and door holder 10 is magnetically attracted to the first ferromagnetic plate 32, and the second magnet 28 of the combination doorstop and door holder 10 is magnetically attracted to the second ferromagnetic plate 30. When the door is moved from a closed position to approach a fully open position, the first and second magnets 26 and 28 are attracted to the first and second ferromagnetic plates 32 and 30, respectively, which causes the first and second bumpers 22 and 24 to engage the first and second ferromagnetic plates 32 and 30. In preferred embodiments, the force of magnetic attraction between first magnet 26 and the first ferromagnetic plate 32, and between the second magnet 28 and the second ferromagnetic plate 30 is sufficient to hold the door in the open position when no external force is being applied by a person to pull them apart. In one embodiment, the force of magnetic attraction may be adjusted by varying the thickness of the materials of the bumper caps 22 and 24 at the impacting tips.

As the term is used herein, a ferromagnetic structure is a structure that contains or consists of a ferrous material or other material that is attracted to a magnet by magnetic force. As will be appreciated by one of ordinary skill in the art, a ferromagnetic material is a material having the same kind of magnetism as iron, such as a material that has high magnetic permeability and appreciable residual magnetism and hysteresis, or that possesses magnetization in the absence of an external magnetic field.

In a second embodiment, the combination doorstop and door holder 10 is configured on the wall or floor and includes one or more magnets or ferromagnetic materials embedded into the frame of a doorway. In a corresponding location on a door that is mounted to the door frame, or on a wall or floor adjacent to the door, one or more magnets or ferromagnetic materials are embedded so as to prevent full closure of the door. The magnets or ferromagnetic materials may incorporate a male and female connector design. Because this embodiment involves no mechanical or moving parts, noise, friction, and wear and tear on components are virtually eliminated.

In a variation of the second embodiment, the magnets or ferromagnetic materials are shrouded in a material allowing for a tight, quiet fit. Such shrouding materials might include, but are not limited to, relatively soft materials, such as polyurethane or other materials with such desirable properties. The magnets or ferromagnetic materials may incorporate a male and female connector design.

In another variation of the second embodiment, the magnetic strength of the magnets or ferromagnetic materials may be adjusted by varying the proximity of the magnets using a worm gear or other device, by use of a magnetic shunt alone or in combination with a worm gear or other device, or by other means. A magnetic shunt might include materials such as, but not limited to, iron-based materials or other materials with such desirable properties that affect the amount of flux passing through the area between the magnet and ferromagnetic material.

As shown in FIGS. 3A-3C, 4A-4C, and 5A-5C, embodiments of a magnetic shunt assembly 36 include, but are not limited to the following.

Figure 3A:
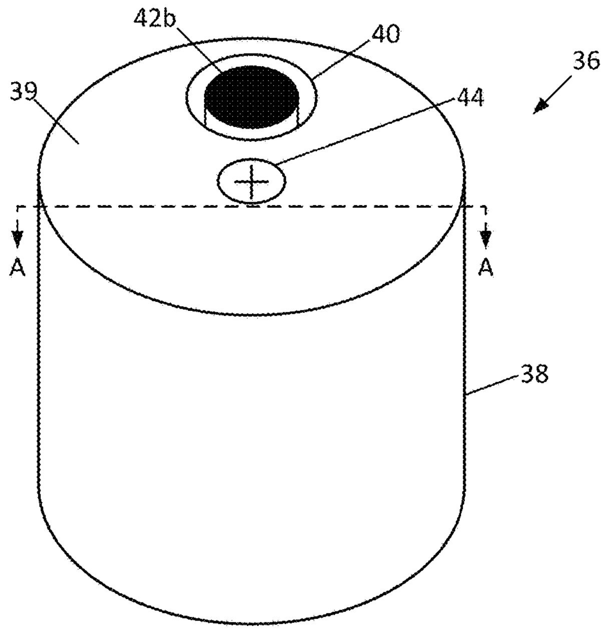
FIGS. 3A, 3B and 3C depict a magnetic shunt assembly according to a first embodiment.
Figure 3B:
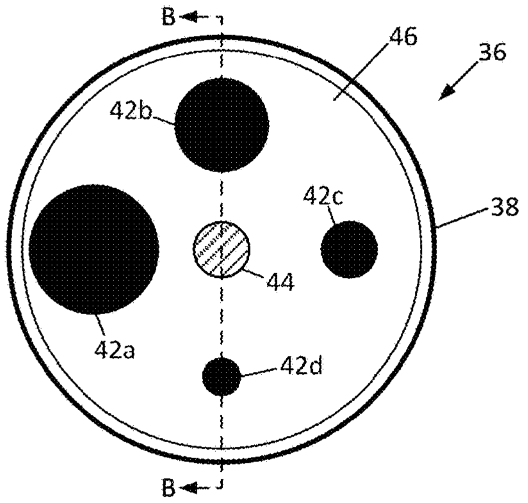
Figure 3C:
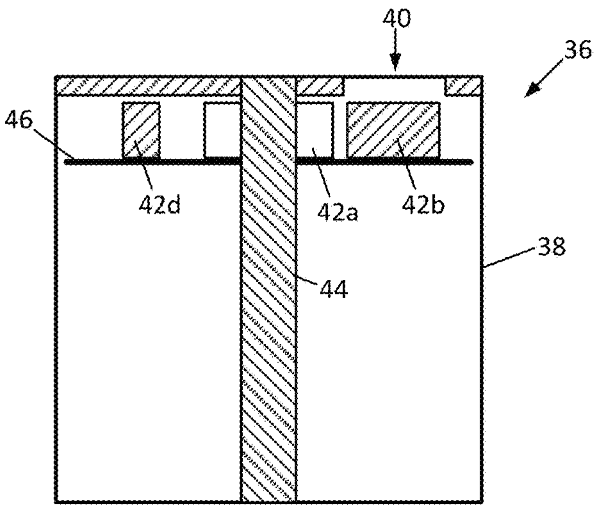
Figure 4A:
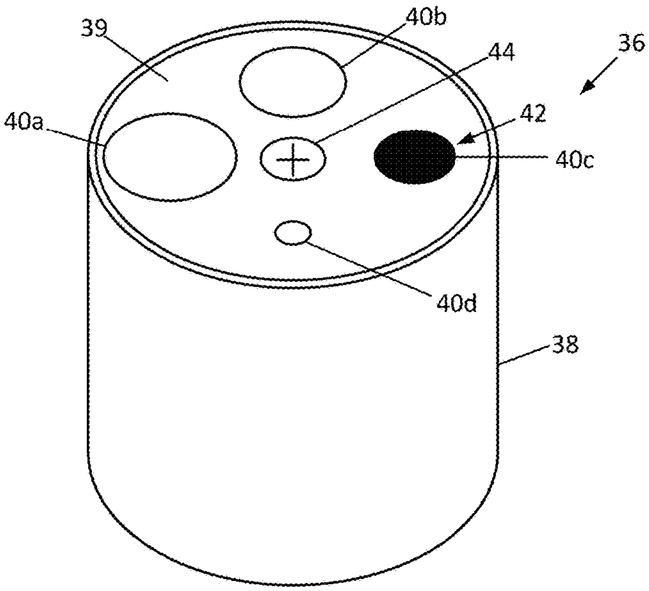
FIGS. 4A, 4B and 4C depict a magnetic shunt assembly according to a second embodiment.
Figure 4B:
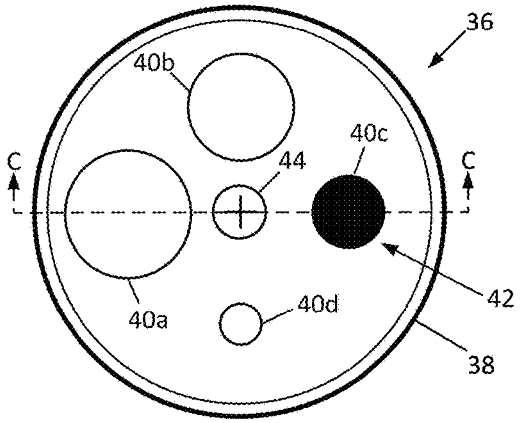
Figure 4C:
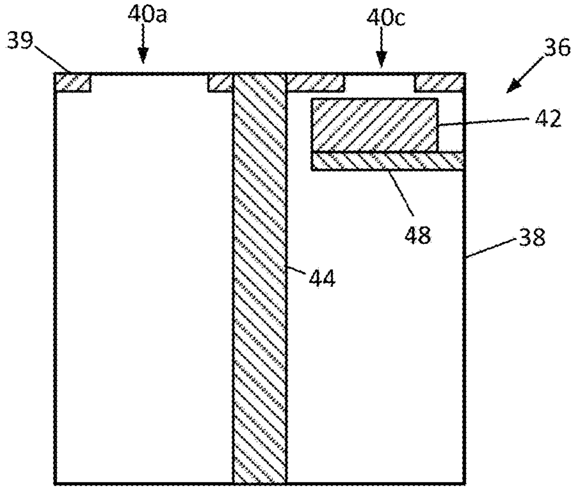
Figure 5A:
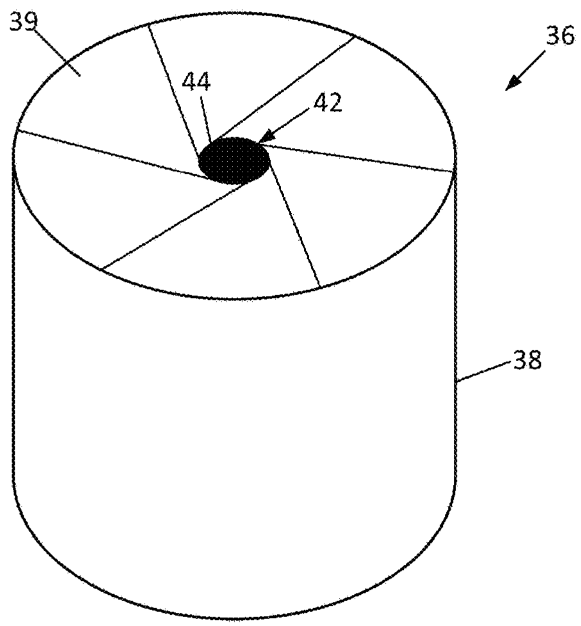
FIGS. 5A, 5B and 5C depict a magnetic shunt assembly according to a third embodiment.
Figure 5B:
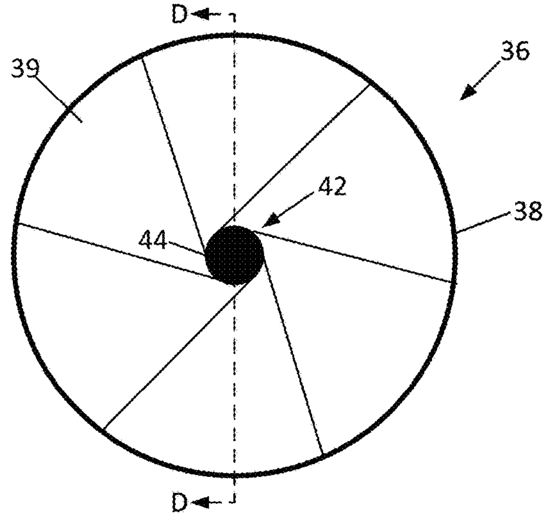
Figure 5C:
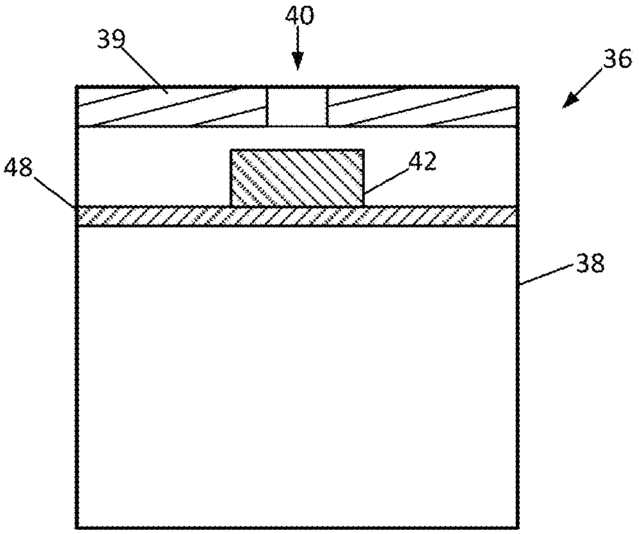

- As shown in FIGS. 3A-3C, a housing 38 contains a rotatable base 46 mounted on a spindle 44. Attached to the top of the base 46 are several magnets 42*a*-42*d* having various strengths. The housing 38 has a fixed top plate 39 made of steel or other ferromagnetic material in which one aperture 40 is disposed. The desired magnetic force of the shunt 36 corresponds to the selection of the magnet 42*a*-42*d* that is aligned with the aperture 40 in the top plate 39.
- As shown in FIGS. 4A-4C, a housing 38 includes a rotatable top plate 39 made of steel or other ferromagnetic material mounted on a spindle 44. The top plate 39 has radially disposed apertures 40*a*-40*d* of various sizes. A stationary magnet 42 is supported on a platform 48 below the top plate 39. The desired magnetic force of the shunt 36 corresponds to the selection of the aperture 40*a*-40*d* that is aligned with the magnet 42.
- As shown in FIGS. 5A-5C, a housing 38 has a top plate 39 made of steel or other ferromagnetic material that includes a mechanically adjustable aperture 44, such as an iris aperture. A stationary magnet 42 is supported on a platform 48 below the top plate 39 in alignment with the aperture 44. The desired magnetic force of the shunt 36 corresponds to the selection of the size of the aperture 44.

The magnets or ferromagnetic materials of the magnetic shunt assembly 36 may also be shrouded in a relatively soft material allowing for a tight, quiet fit, as described above, and the magnets or ferromagnetic materials may incorporate a male and female connector design, as described above.

The foregoing description of preferred embodiments for this invention have been presented for purposes of illustration and description. They are not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention.

The invention claimed is:

1. A magnetic doorstop and door holder comprising:

- a hinge pin doorstop body having a first end and an opposing second end;
- a hinge pin receiving aperture disposed at the first end of the hinge pin doorstop body, the hinge pin receiving aperture configured to receive a hinge pin of a hinge of a door;
- a first leg having a proximal end and a distal end, the proximal end connected to the second end of the hinge pin doorstop body, and the distal end extending outward from the hinge pin doorstop body;
- an engagement member disposed at the second end of the hinge pin doorstop body adjacent the proximal end of the first leg;
- a second leg having a proximal end and a distal end, the proximal end adjustably received in the engagement member, and the distal end extending outward from the engagement member;
- a first bumper attached to the distal end of the first leg;
- a second bumper attached to the distal end of the second leg;
- a first magnet embedded within the first bumper;
- a second magnet embedded within the second bumper;
- a first ferromagnetic structure configured for attachment to the door, the first ferromagnetic structure comprising one or more materials that are magnetically attracted to the first magnet, wherein a portion of the first bumper is disposed between the first magnet and the first ferromagnetic structure when the first bumper is engaged with the first ferromagnetic structure, such that a force of magnetic attraction between the first magnet and the first ferromagnetic structure may be adjusted based on selection of a thickness of the portion of the first bumper disposed between the first magnet and the first ferromagnetic structure; and
- a second ferromagnetic structure configured for attachment to a door frame, door jamb, wall, or other entryway structure to which the hinge is attached, the second ferromagnetic structure comprising one or more materials that are magnetically attracted to the second magnet, wherein a portion of the second bumper is disposed between the second magnet and the second ferromagnetic structure when the second bumper is engaged with the second ferromagnetic structure, such that a force of magnetic attraction between the second magnet and the second ferromagnetic structure may be adjusted based on selection of a thickness of the portion of the second bumper disposed between the second magnet and the second ferromagnetic structure.

2. The magnetic doorstop and door holder of claim 1 wherein the second leg comprises a threaded shaft and the engagement member comprises a threaded aperture that receives the threaded shaft.

3. The magnetic doorstop and door holder of claim 1 wherein the first and second bumpers are formed from polyurethane.

4. The magnetic doorstop and door holder of claim 1 wherein one or both of the first ferromagnetic structure and the second ferromagnetic structure comprise a ferromagnetic plate.

5. The magnetic doorstop and door holder of claim 1 wherein one or both of the first ferromagnetic structure and the second ferromagnetic structure comprise a magnetic shunt assembly.

6. The magnetic doorstop and door holder of claim 5 wherein the magnetic shunt assembly includes a housing comprising a fixed top plate having an aperture disposed therein, the housing containing a rotatable base on which a plurality of magnets of different magnetic strengths are attached in proximity to the fixed top plate, wherein the rotatable base is configured to rotate within the housing with respect to the fixed top plate, wherein a force of magnetic attraction between the magnetic shunt assembly and the first or second magnet is adjustable based on rotation of the rotatable base to select only one of the plurality of magnets to be aligned with the aperture in the top plate.

7. The magnetic doorstop and door holder of claim 5 wherein the magnetic shunt assembly includes a housing containing a rotatable top plate in which a plurality of apertures of various sizes are disposed, and a third magnet fixedly attached to the housing in proximity to the rotatable top plate, wherein a force of magnetic attraction between the magnetic shunt assembly and the first or second magnet is adjustable based on selection of one of the plurality of apertures to be aligned with the third magnet.

8. The magnetic doorstop and door holder of claim 5 wherein the magnetic shunt assembly includes a housing containing a top plate in which an adjustable size iris aperture is centrally disposed, and a third magnet fixedly attached to the housing in proximity to the top plate and in alignment with the adjustable size iris aperture, wherein a force of magnetic attraction between the magnetic shunt assembly and the first or second magnet is adjustable based on adjusting the size of the adjustable size iris aperture.

9. A magnetic shunt assembly for adjustment of a force of magnetic attraction between the magnetic shunt assembly and an adjacent ferromagnetic structure, the magnetic shunt assembly comprising:

a housing comprising a fixed top plate having an aperture disposed therein, the housing containing a rotatable base on which a plurality of magnets of different magnetic strengths are attached in proximity to the fixed top plate, wherein the rotatable base is configured to rotate within the housing with respect to the fixed top plate, wherein the force of magnetic attraction between the magnetic shunt assembly and the adjacent ferromagnetic structure is adjustable based on rotation of the rotatable base to select only one of the plurality of magnets to be aligned with the aperture in the top plate; or a housing containing a magnet fixedly attached to the housing, the housing including a rotatable top plate disposed in proximity to the magnet, the rotatable top plate configured to rotate with respect to the magnet, the rotatable top plate having a plurality of apertures of different sizes disposed therein, wherein the force of magnetic attraction between the magnetic shunt assembly and the adjacent ferromagnetic structure is adjustable based on selection of one of the plurality of apertures to be aligned with the magnet; or a housing containing a top plate in which an adjustable size iris aperture is centrally disposed, and a magnet fixedly attached to the housing in proximity to the top plate and in alignment with the adjustable size iris aperture, wherein a force of magnetic attraction between the magnetic shunt assembly and the adjacent ferromagnetic structure is adjustable based on adjusting the size of the adjustable size iris aperture.

10. The magnetic shunt assembly of claim 9 wherein the adjacent ferromagnetic structure comprises a magnet associated with a magnetic doorstop or a magnetic door holder.

11. A magnetic doorstop and door holder comprising:

a hinge pin doorstop body having a first end and an opposing second end;

a hinge pin receiving aperture disposed at the first end of the hinge pin doorstop body, the hinge pin receiving aperture configured to receive a hinge pin of a hinge of a door;

a first leg having a proximal end and a distal end, the proximal end connected to the second end of the hinge pin doorstop body, and the distal end extending outward from the hinge pin doorstop body;

an engagement member disposed at the second end of the hinge pin doorstop body adjacent the proximal end of the first leg;

a second leg having a proximal end and a distal end, the proximal end adjustably received in the engagement member, and the distal end extending outward from the engagement member;

a first bumper attached to the distal end of the first leg;

a second bumper attached to the distal end of the second leg;

a first magnet attached to the first bumper;

a second magnet attached to the second bumper;

a first ferromagnetic structure configured for attachment to the door, the first ferromagnetic structure comprising one or more materials that are magnetically attracted to the first magnet; and a second ferromagnetic structure configured for attachment to a door frame, door jamb, wall, or other entryway structure to which the hinge is attached, the second ferromagnetic structure comprising one or more materials that are magnetically attracted to the second magnet, wherein one or both of the first ferromagnetic structure and the second ferromagnetic structure comprise a magnetic shunt assembly that includes a housing containing a rotatable top plate in which a plurality of apertures of different sizes are disposed, and a third magnet fixedly attached to the housing in proximity to the rotatable top plate, wherein a force of magnetic attraction between the magnetic shunt assembly and the first or second magnet is adjustable based on selection of one of the plurality of apertures to be aligned with the third magnet.

* * * * *